United States Patent
Eguchi et al.

(10) Patent No.: US 11,429,721 B2
(45) Date of Patent: Aug. 30, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Takami Eguchi, Tokyo (JP); Nobuhiro Tagashira, Nagareyama (JP); Ayuta Kawazu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/909,909

(22) Filed: Jun. 23, 2020

(65) Prior Publication Data
US 2020/0410103 A1 Dec. 31, 2020

(30) Foreign Application Priority Data
Jun. 27, 2019 (JP) .............................. JP2019-120327

(51) Int. Cl.
*G06F 21/57* (2013.01)

(52) U.S. Cl.
CPC ...... *G06F 21/572* (2013.01); *G06F 2221/033* (2013.01)

(58) Field of Classification Search
CPC .................. G06F 21/572; G06F 2221/033
See application file for complete search history.

(56) References Cited

U.S. PATENT DOCUMENTS

| 5,960,182 | A | * | 9/1999 | Matsuoka | ............... G06F 30/33 703/22 |
| 2012/0099417 | A1 | * | 4/2012 | Sun | ....................... H04W 24/04 370/216 |
| 2018/0019880 | A1 | * | 1/2018 | Wu | ......................... G06F 21/50 |
| 2019/0026468 | A1 | * | 1/2019 | Minamikawa | ........ H04L 9/0866 |

FOREIGN PATENT DOCUMENTS

JP 2019-191698 A 10/2019

* cited by examiner

*Primary Examiner* — Ashokkumar B Patel
*Assistant Examiner* — William B Jones
(74) *Attorney, Agent, or Firm* — Canon U.S.A., Inc. IP Division

(57) ABSTRACT

An information processing apparatus includes a verification unit configured to verify, using a method starting with hardware verification at a time of startup of a system, partial software which is divided into a plurality of parts and gradually started up, a second verification unit configured to verify another partial software based on the verified partial software, and a third verification unit configured to verify software to be executed at an arbitrary timing prior to execution of the software. In a case where the third verification unit is in operation at a time of update of the partial software, the operation of the third verification unit is stopped, and restart is performed after completion of the update, so that a sequence of verification processes starting with the hardware verification up to a result of verification at a time of execution is applied.

6 Claims, 12 Drawing Sheets

FIG.4

| FILE NAME<br>3001 | HASH<br>3002 |
|---|---|
| /bin/cat | 270c2468bd4fdbc9e89ae71 |
| /lib/libc.so | e26b6d7fdd32a3e50cfb5cb |
| /lib/libm.so | 887xb9019a76dcdbbfefe25 |

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus that verifies software and an information processing method.

Description of the Related Art

There have been arising problems such as an attempt by a third party to tamper with a program for controlling an information processing apparatus in an unauthorized manner and steal information assets in the information processing apparatus and an attempt to use such an information processing apparatus with the program tampered for another attack. In order to prevent such attempts, methods for verifying that programs in information processing apparatuses have not been tampered with by third parties have been developed.

In order to guarantee that a program in an information processing apparatus have not been tampered with in a case where a user uses a function that is realized by the information processing apparatus, it is necessary to verify a program for realizing the function immediately before execution of the program. This is because if there is a time lag between the verification and the execution of the program, a case in which the program is tampered with in the time lag cannot be dealt with.

As an example of a method for verifying a program immediately before execution of the program, a method using a hooking program (an program for verification at execution) for hooking a request to execute the program and a white list is discussed in Japanese Patent Application No. 2018-080775. A white list is a list of programs that are permitted to be started up. In this method, a hash value of the program is calculated and compared with the white list before the startup of the program, and the program is started up only in a case where the hash value coincides with the white list. In a case where the verification of the program fails, an error is returned to the execution request of the program. At this time, the error is returned to a process as a general error with respect to the execution request of the program. In a case where there is no white list, it is regarded that all programs are not described in the white list at the time of verification of the programs, so that verification of all programs fails and the programs are not executed. Therefore, the white list needs be created without before enabling verification of the program.

Writing control for permitting writing to a nonvolatile memory and an external storage device can be performed on the program that is permitted to be started up.

According to the method, an information processing apparatus which executes a program by multiple processes does not need to verify the program every time the program is executed in each process for executing the program and can have the hooking program execute the verification.

According to the conventional technique, if software is updated in a state in which a verification-at-execution function is enabled, the verification-at-execution function performs writing control on a software update program. Thus, the software update program becomes a verification target, and software update takes several times longer than usual.

The present invention is directed to prevention of reduction in a processing speed while maintaining security by disabling writing control in a case where software is updated in a state in which a verification-at-execution function is enabled and performing restart and verification at startup after completion of software update.

SUMMARY OF THE INVENTION

According to an aspect of the present invention, an information processing apparatus includes a verification unit configured to verify, using a method starting with hardware verification at a time of startup of a system, partial software which is divided into a plurality of parts and gradually started up, a second verification unit configured to verify another partial software based on the verified partial software, and a third verification unit configured to verify software to be executed at an arbitrary timing prior to execution of the software. In a case where the third verification unit is in operation at a time of update of the partial software, the operation of the third verification unit is stopped, and restart is performed after completion of the update, so that a sequence of verification processes starting with the hardware verification up to a result of verification at a time of execution is applied.

Further features of the present invention will become apparent from the following description of exemplary embodiments with reference to the attached drawings.

BRIEF DESCRIPTION OF THE DRAWINGS

FIG. 4 illustrates an example of a correct value list and a white list.

DESCRIPTION OF THE EMBODIMENTS

Exemplary embodiments of the present invention will be described based on the drawings. According to a first exemplary embodiment, software update processing and software verification processing at a time of execution of a function will be described. The present exemplary embodiment will be described using a multifunction peripheral (MFP) as an example. However, the present invention is a technique applicable to an arbitrary information processing apparatus other than an MFP.

Figure 1:
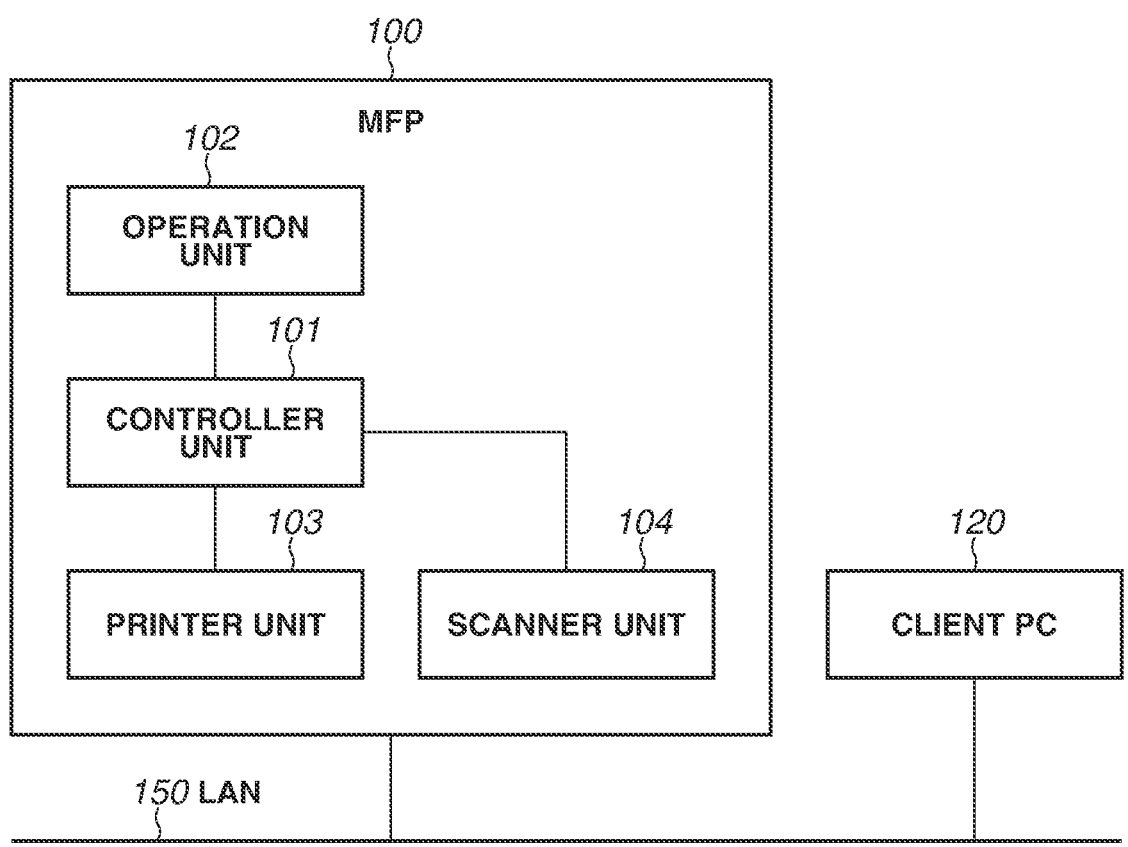
FIG. 1 is a block diagram illustrating a connection form between a multifunction peripheral (MFP) and a client personal computer (PC).

FIG. 1 is a block diagram illustrating a connection form between an MFP and a client personal computer (PC). An MFP 100 is connected to a client PC 120 via a local area network (LAN) 150. The MFP 100 includes an operation unit 102 which performs input and output with a user. The MFP 100 also includes a printer unit 103 which outputs electronic data onto a paper medium. The MFP 100 further includes a scanner unit 104 which reads an image on a paper medium and converts the read image into electronic data. The operation unit 102, the printer unit 103, and the scanner unit 104 are connected to a controller unit 101 and realize functions as the MFP 100 under control by the controller unit 101. The client PC 120 performs processing such as transmission of a print job to the MFP 100.

Figure 2:
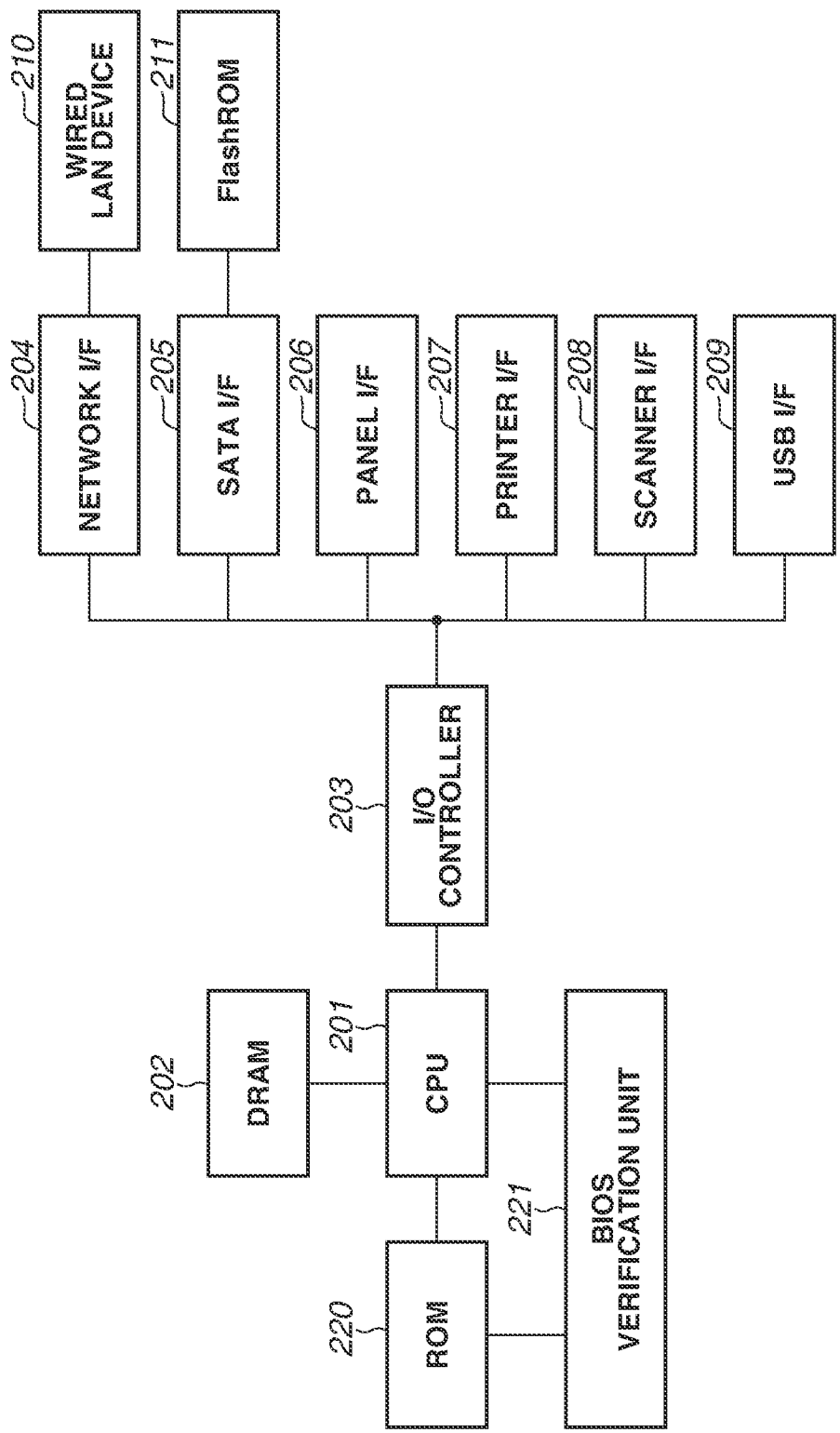
FIG. 2 is an internal configuration diagram of a controller unit in the MFP.

FIG. 2 is a block diagram illustrating details of the controller unit 101 in the MFP 100. A central processing unit (CPU) 201 performs main calculation processing in the controller unit 101. The CPU 201 is connected to a dynamic random access memory (DRAM) 202 via a bus. The DRAM 202 is used by the CPU 201 as a working memory for temporarily storing program data expressing an operation instruction in a process of calculation by the CPU 201 and a data to be processed. The CPU 201 is connected to an input/output (I/O) controller 203 via the bus. The I/O controller 203 performs input and output with various devices according to an instruction from the CPU 201. The I/O controller 203 is connected to a Serial Advanced Technology Attachment (SATA) interface (I/F) 205 which is connected to a flash read-only memory (ROM) 211. The CPU 201 uses the flash ROM 211 to permanently store a program for realizing a function of the MFP 100 and a document file. The I/O controller 203 is also connected to a network I/F 204, and the network I/F 204 is connected to a wired LAN device 210. The CPU 201 realizes communication on the LAN 150 by controlling the wired LAN device 210 via the network I/F 204. The I/O controller 203 is connected to a panel I/F 206, and the CPU 201 realizes input and output from and to a user using the operation unit 102 via the panel I/F 206. The I/O controller 203 is connected to a printer I/F 207, and the CPU 201 realizes outputting processing on a paper medium using the printer unit 103 via the printer I/F 207. The I/O controller 203 is connected to a scanner I/F 208, and the CPU 201 realizes processing for reading a document using the scanner unit 104 via the scanner I/F 208. The I/O controller 203 is connected to a Universal Serial Bus (USB) I/F 209 and controls an arbitrary device connected to the USB I/F 209. A ROM 220 is connected to the CPU 201 via the bus and stores a control program for realizing a Basic Input Output System (BIOS) therein. A BIOS verification unit 221 that is connected to the ROM 220 and the CPU 201 via the bus verifies BIOS data stored in the ROM 220 and issues a BIOS startup instruction to the CPU 201. Here, the BIOS verification unit 221 is a hardware unit, and BIOS verification is hardware verification. In order to prevent the bus connecting the BIOS verification unit 221 and the CPU 201 from being altered by a malicious third party, the BIOS verification unit 221 and the CPU 201 are realized on the same chip or in a configuration equivalent thereto in such a manner that the bus cannot be physically confirmed from the outside. According to the present exemplary embodiment, it is assumed that a control mechanism of the BIOS verification unit 221 is realized by hardware as an integrated circuit. However, the present exemplary embodiment may adopt a configuration in which elements such as a dedicated CPU and a ROM storing control software are disposed on the same chip and cannot be changed after manufacturing.

In a case where a copy function is executed, the CPU 201 loads program data from the flash ROM 211 into the DRAM 202 via the SATA I/F 205. The CPU 201 detects, via the panel I/F 206, a copy instruction input by a user to the operation unit 102 according to the program loaded into the DRAM 202. In a case where the CPU 201 detects the copy instruction, the CPU 201 receives a document as electronic data from the scanner unit 104 via the scanner I/F 208 and stores the received data in the DRAM 202. The CPU 201 performs color conversion processing suitable for outputting on image data stored in the DRAM 202. The CPU 201 transfers the image data stored in the DRAM 202 to the printer unit 103 via the printer I/F 207 and performs processing for outputting the image data onto a paper medium.

In a case where page description language (PDL) printing is performed, the client PC 120 issues a print instruction via the LAN 150. The CPU 201 loads program data from the flash ROM 211 into the DRAM 202 via the SATA I/F 205 and detects the print instruction via the network I/F 204 according to the program loaded into the DRAM 202. In a case where the CPU 201 detects a PDL transmission instruction, the CPU 201 receives print data via the network I/F 204 and stores the print data in the flash ROM 211 via the SATA I/F 205. If storing of the print data is completed, the CPU 201 loads the print data stored in the flash ROM 211 into the DRAM 202 as image data. The CPU 201 performs color conversion processing suitable for outputting on the image data stored in the DRAM 202. The CPU 201 transfers the image data stored in the DRAM 202 to the printer unit 103 via the printer I/F 207 and performs processing for outputting the image data onto a paper medium.

Figure 3:
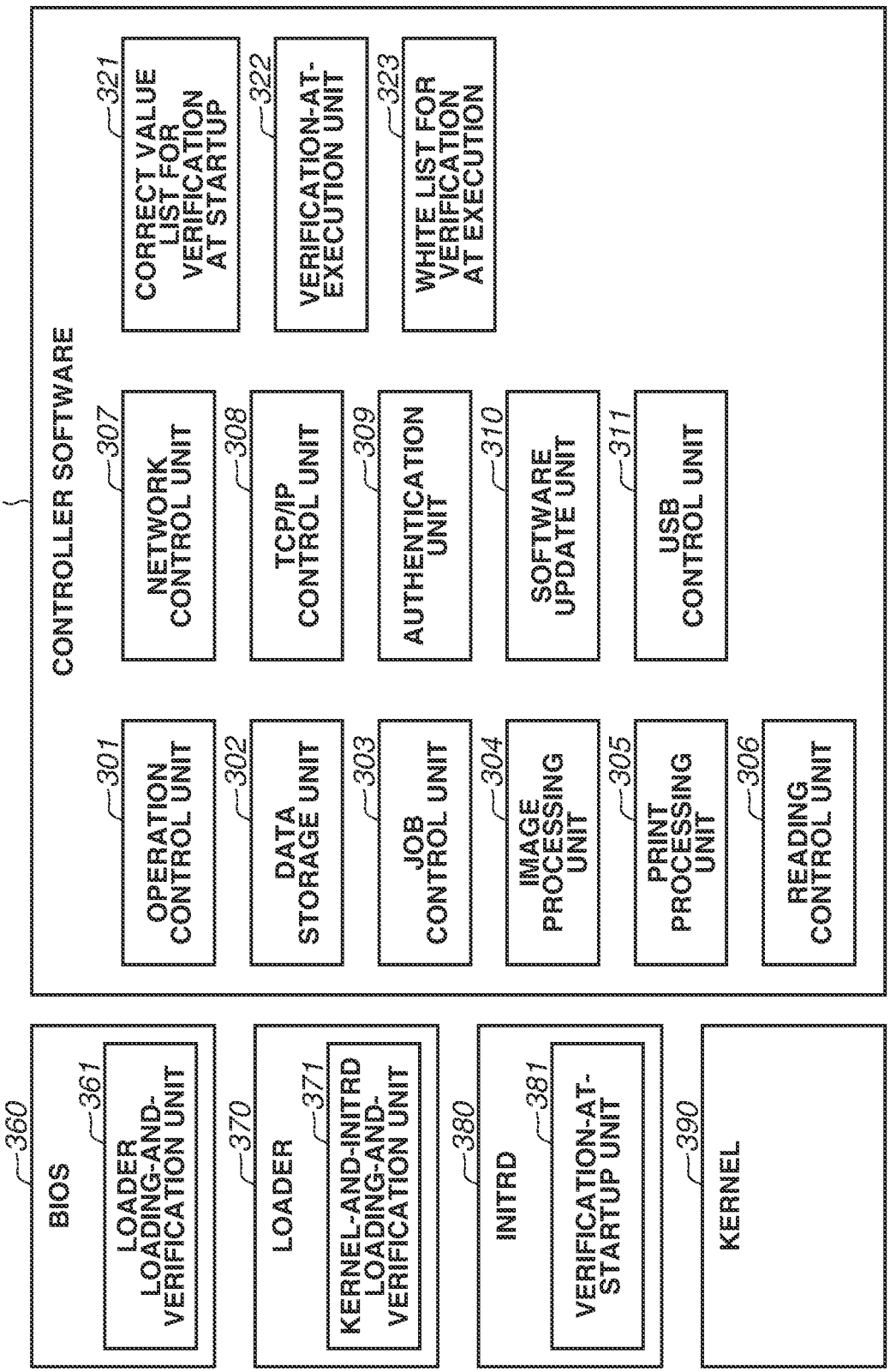
FIG. 3 is a block diagram illustrating software executed in a controller in the MFP.

FIG. 3 is a block diagram illustrating a structure of software to be executed by the controller unit 101 in the MFP 100. The CPU 201 executes entire software to be executed in the controller unit 101. The CPU 201 executes a BIOS 360 stored in the ROM 220. The CPU 201 loads a loader 370, an initial ramdisk (Initrd) 380, and controller software 300 stored in the flash ROM 211 into the DRAM 202 and then executes them. The BIOS 360 executes basic processing for the CPU 201 to control the I/O controller 203 and the DRAM 202. The BIOS 360 includes control software internally functioning as a BIOS and signature data corresponding to the control software. A loader loading-and-verification unit 361 is included in the control software of the BIOS 360 and includes processing for verifying the loader and a public key corresponding to a signature assigned to the loader. The BIOS 360 further includes processing for loading the loader 370 from the flash ROM 211 and starting the loader 370. The loader 370 executes processing for loading a kernel 390 and the Initrd 380 from the flash ROM 211 and starting them. The loader 370 includes control software internally functioning as a loader and signature data corresponding to the control software. A kernel-and-Initrd loading-and-verification unit 371 is included in the loader 370 and includes processing for verifying the kernel and the Initrd and a public key corresponding to a signature assigned to the kernel and the Initrd. The Initrd 380 executes processing for loading the controller software 300 from the flash ROM 211 and starting the controller software 300. The Initrd 380 includes control software internally functioning as an Initrd and signature data corresponding to the control software. A verification-at-startup unit 381 is included in the Initrd 380 and includes processing for verifying all program files included in the controller software 300 at the time of startup and a public key corresponding to an assigned signature. Secret keys corresponding to all pieces of the signature data are used only at the time of development of the software and are not generally distributed.

An operation control unit 301 displays a screen image for a user on the operation unit 102, detects a user operation, and executes processing associated with a screen component such as a button displayed on the screen. A data storage unit 302 stores and reads data in and from the flash ROM 211 in response to a request from another control unit. For example, in a case where a user wants to change a device setting, the operation control unit 301 detects a content input by the user to the operation unit 102, and the data storage unit 302 stores the input content as a setting value in the flash ROM 211 in response to a request from the operation control unit 301. A network control unit 307 performs a network setting, such as an Internet Protocol (IP) address, in a Transmission Control Protocol/Internet Protocol (TCP/IP) control unit 308 at a time when the system is started up or when a setting change is detected, according to a setting value stored in the data storage unit 302. The TCP/IP control unit 308 performs transmission and reception processing of a network packet via the network I/F 204 according to an instruction from another control unit. A job control unit 303 controls execution of a job according to an instruction from another control unit. An image processing unit 304 processes image data into a form suitable for each use according to an instruction from the job control unit 303. A print processing unit 305 prints an image on a paper medium and outputs the paper medium via the printer I/F 207 according to an instruction from the job control unit 303. A reading control unit 306 reads a set document via the scanner I/F 208 according to an instruction from the job control unit 303. An authentication unit 309 performs processing for determining whether an operator is an administrator in a case where an administrator authority is required for an operation. A software update unit 310 performs processing for updating the program files included in the controller software 300 in an installed environment. A USB control unit 311 controls an arbitrary USB-connected device by controlling the USB I/F 209. A correct value list for verification at startup 321 is a list of correct values used by the verification-at-startup unit 381 in verification processing. A verification-at-execution unit 322 includes processing for verifying all of the program files included in the controller software 300 at the time of execution. A white list for verification at execution 323 is a list of correct values used by the verification-at-execution unit 322 in verification processing.

For example, in a case where the copy function is executed, the operation control unit 301 detects a start request for the copy function and instructs the job control unit 303 to perform copying. The job control unit 303 instructs the reading control unit 306 to read a document and obtains a scanned image. The job control unit 303 instructs the image processing unit 304 to convert the scanned image into a form suitable for printing. The job control unit 303 instructs the print processing unit 305 to perform printing and outputs a copy result.

FIG. 4 illustrates a sample of data formats of the correct value list for verification at startup 321 and the white list for verification at execution 323. A combination of a file name 3001 and a hash 3002 is listed with respect to all program files included in the controller software 300. The data content includes at least a file name, a location where the file is arranged (a position in a directory), and a hash value calculated from the file. Although the correct value list for verification at startup 321 and the white list for verification at execution 323 can be the same file, the correct value list for verification at startup 321 and the white list for verification at execution 323 are separate files differing in generation timing and use form according to the present exemplary embodiment.

Figure 5:
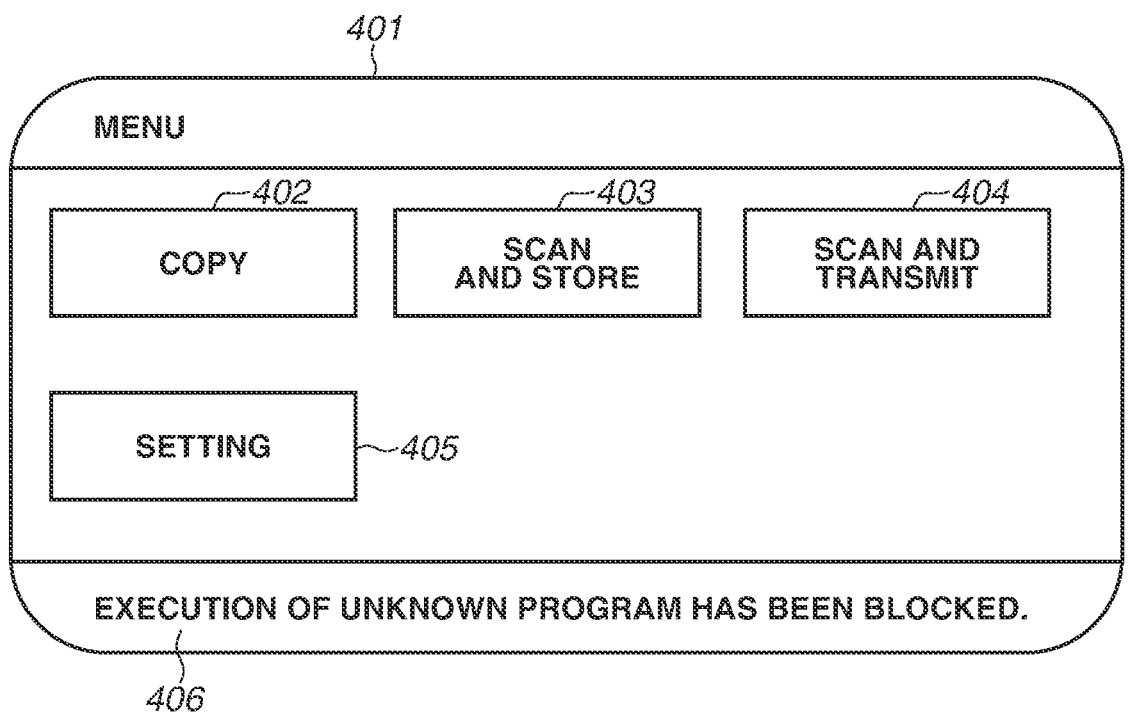
FIG. 5 illustrates a configuration of a screen for use in setting.

FIG. 5 illustrates an example of a menu screen 401 which is displayed on the operation unit 102 and is used by a user to issue an instruction to execute various functions of the MFP 100. A button 402 is used by a user to issue an instruction to execute the copy function. A button 403 is used by a user to issue an instruction to execute a scan-and-store function. A button 404 is used by a user to issue an instruction to execute a scan-and-transmit function. A button 405 is used by a user to issue an instruction to change a setting of the device. If the button 405 is pressed, a setting screen 501 (FIG. 6) is displayed. In a message display area 406, various messages to a user which are generated during operation of the device are displayed.

Figure 6:
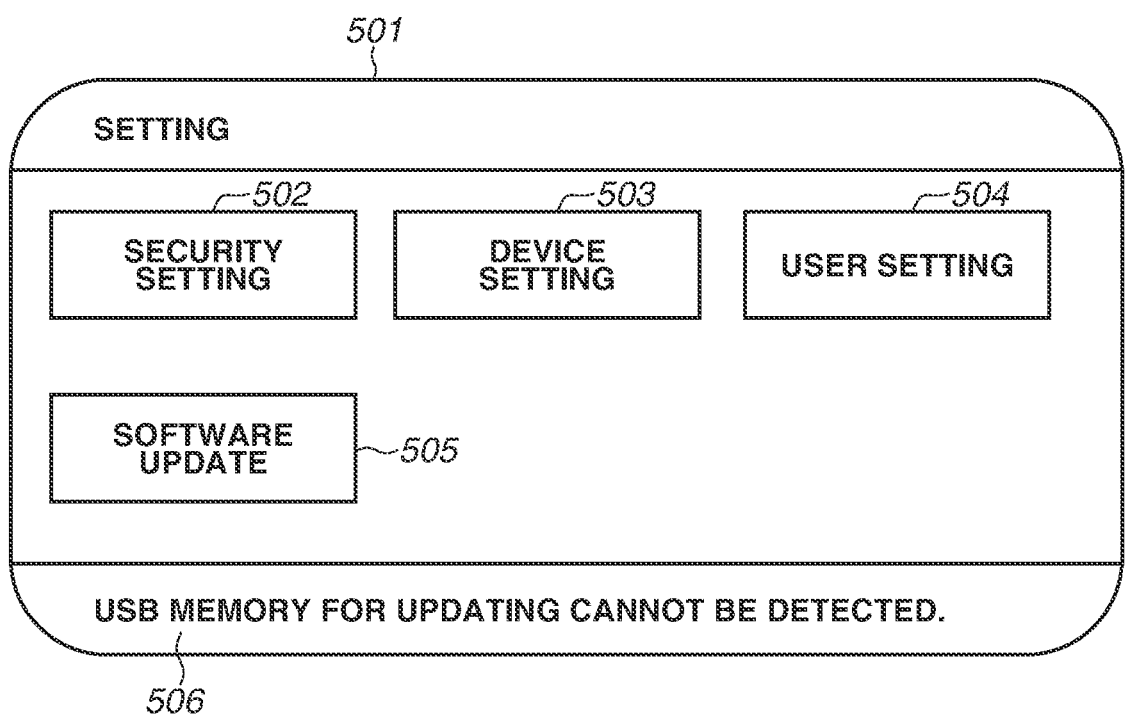
FIG. 6 illustrates a configuration of a screen for use in setting.

FIG. 6 illustrates an example of the setting screen 501 which is displayed on the operation unit 102 and is used by a user to issue an instruction for various settings. The setting screen 501 itself does not include a specific setting item and is an intermediate level screen for guiding to detailed setting items. If a button 502 is pressed, a security setting screen (not illustrated) is displayed. If a button 503 is pressed, a device setting screen (not illustrated) is displayed. If a button 504 is pressed, a user setting screen (not illustrated) is displayed. If a button 505 is pressed, update of the software is started. In a message display area 506, various messages to a user which are generated during operation of the device are displayed.

Figure 7:
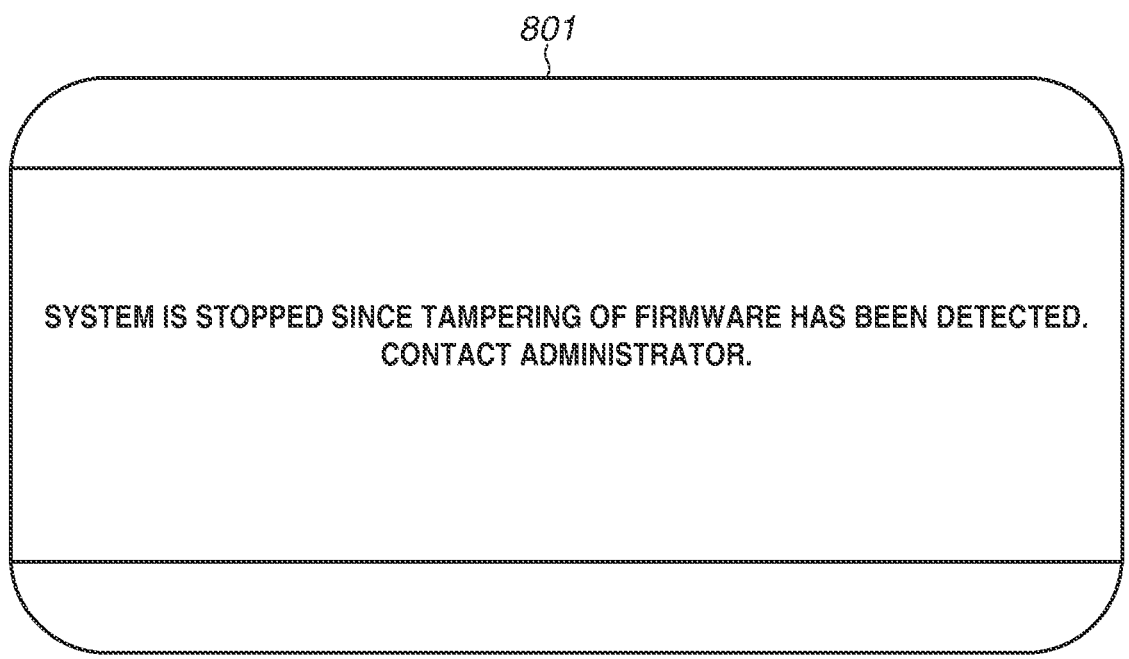
FIG. 7 illustrates a configuration of a screen for use in setting.

FIG. 7 illustrates an example of an error screen 801 which is displayed on the operation unit 102. The error screen 801 notifies a user of a system stop error indicating that firmware is tampered with and the system is stopped. A shift from the error screen 801 to a normal function execution screen is not allowed, and a user does not use the MFP 100 in this state.

A processing flow of a verification-at-execution function and a verification-at-startup function in a case where the MFP 100 updates the software will be described with reference to FIGS. 8a and 8B.

Figure 8:
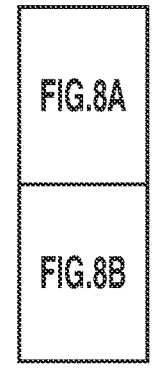
FIG. 8 consisting
Figure 8A:
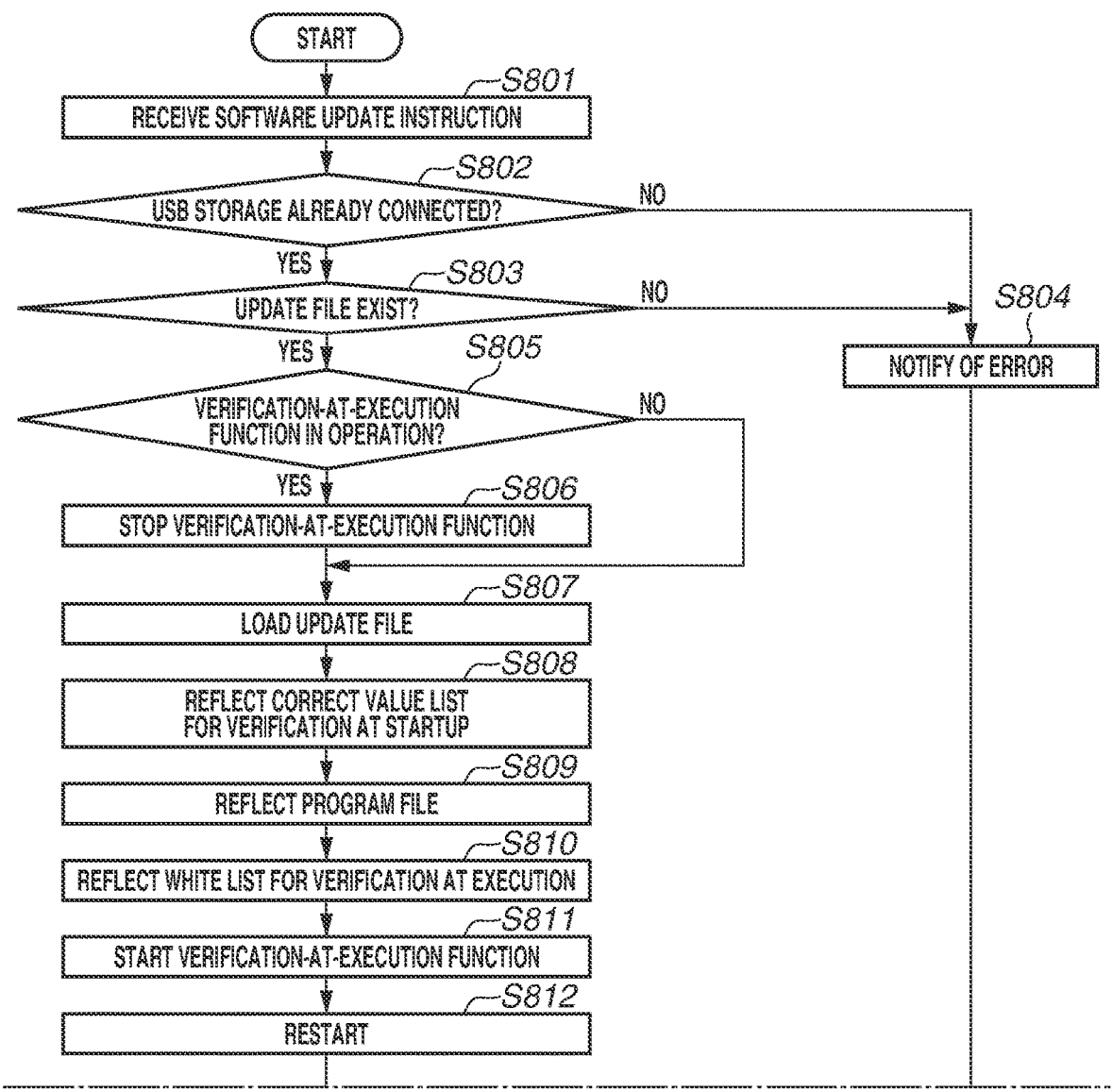
FIGS. 8A and 8B is a flowchart illustrating a flow of processing to be performed in the MFP.
Figure 8B:
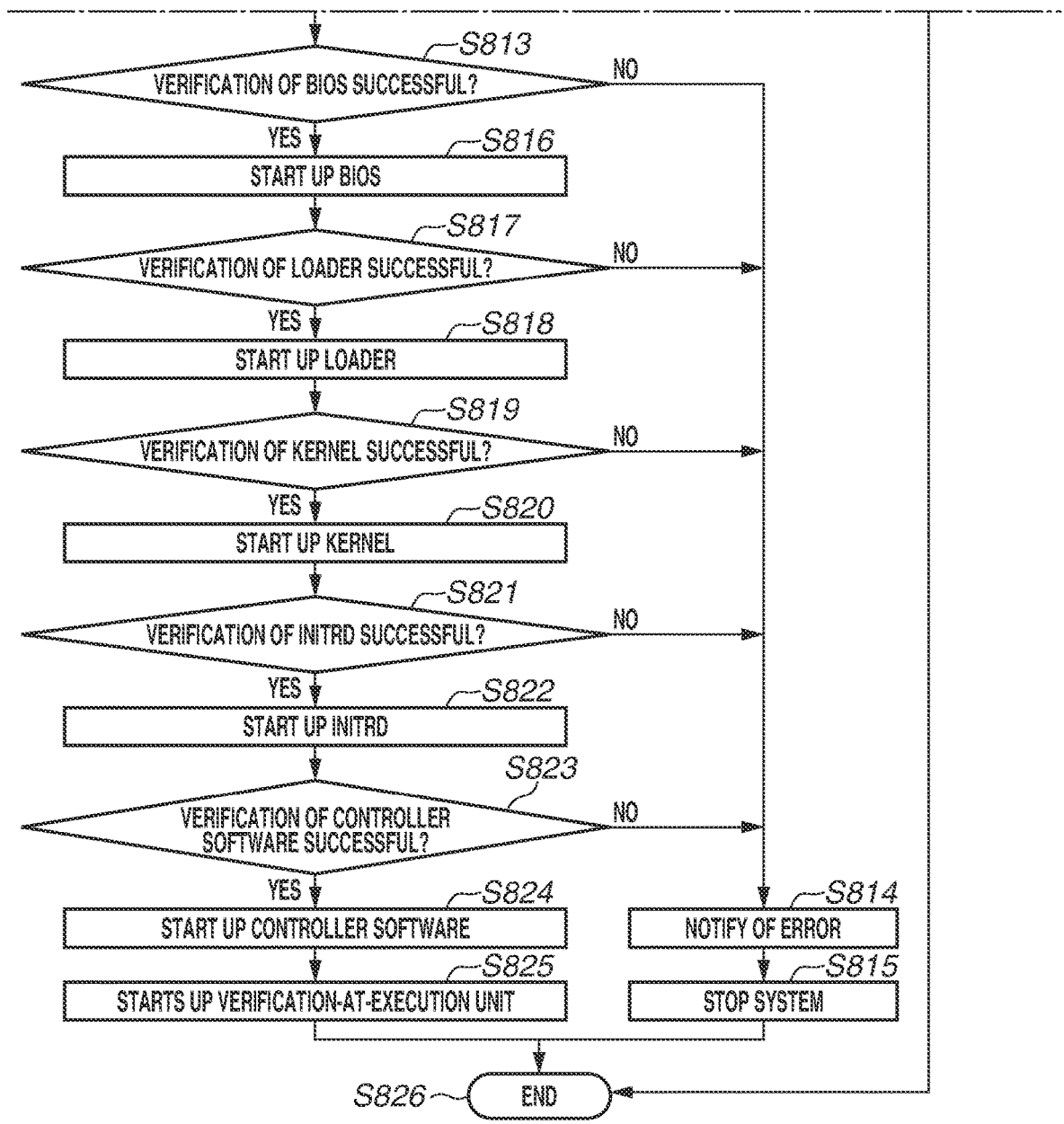

Update processing to be performed by the MFP 100 in FIGS. 8A and 8B is performed by the CPU 201 loading a program stored in the flash ROM 211 into the DRAM 202 and executing the program as calculation processing.

If the button 505 is pressed, software update is instructed, and, then in step S801, the MFP 100 starts software update processing. The software update processing is performed by the software update unit 310.

In step S802, the MFP 100 confirms whether a USB storage is already connected using the USB control unit 311. In a case where the connection is confirmed (YES in step S802), the MFP 100 executes processing in step S803. In a case where the connection is not confirmed (NO in step S802), the MFP 100 executes processing in step S804. In step S804, the MFP 100 displays an error message in the message display area 506 displayed on the operation unit 102.

In step S803, the MFP 100 confirms whether an update file exists in the USB storage using the USB control unit 311. In a case where an update file is confirmed (YES in step S803), the MFP 100 executes processing in step S805. In a case where an update file is not confirmed (NO in step S803), the MFP 100 executes the processing in step S804. At this time, a file name, a file format, a signature of the file, and the like may be verified to confirm that the update file is valid.

In step S805, the MFP 100 confirms whether the verification-at-execution function is in operation. If the verification-at-execution function is not in operation (NO in step S805), the MFP 100 executes processing in step S807. If the verification-at-execution function is in operation (YES in step S805), the MFP 100 executes processing in step S806. In step S806, the MFP 100 stops the verification-at-execution function. A reason to stop the verification-at-execution function is that the number of program files to be updated normally reaches several hundreds, and update of the software takes time since the software update unit 310 performs verification using the white list for verification at execution 323 each time writing is performed.

Only a writing control function in the verification-at-execution function may be stopped.

In step S807, the MFP 100 loads the update file to exist in the USB storage by the USB control unit 311 into a temporary area in the flash ROM 211 using the data storage unit 302.

In step S808, the MFP 100 reflects a new correct value list for verification at startup 321 included in the update file in a storage area for the correct value list for verification at startup in the flash ROM 211 using the data storage unit 302.

In step S809, the MFP 100 reflects the program file included in the update file in a program storage area in the flash ROM 211 using the data storage unit 302. As the program file to be reflected at this time, only a file that needs to be changed may be reflected, or all files including those files that need no change may be reflected.

In step S810, the MFP 100 reflects the program file reflected in step S809 in the white list for verification at execution 323 using the verification-at-execution unit 322. The white list for verification at execution 323 is data including a file name, a file path, and a hash value of the program file. In a case of a device to which an extended function can be added as an application, the software update unit 310 adds information corresponding to the application to the white list for verification at execution 323 at a timing when the application is added. Accordingly, even in a case of the device to which an application can be added later on, tampering of the software can be detected.

In step S811, the MFP 100 starts the verification-at-execution function.

In step S812, the MFP 100 restarts the system.

Step S813 and subsequent steps indicate a processing flow to be performed by the MFP 100 to verify the software at the time of startup. The processing is performed once each time the system is started. The processing to be performed by the MFP 100 in step S813 is performed by the BIOS verification unit 221. In the following description, verification processing in step S813 is referred to as hardware verification. The processing to be performed by the MFP 100 in step S817 and subsequent steps is performed by the CPU 201 loading a program stored in the flash ROM 211 into the DRAM 202 and executing the program as calculation processing. In the following description, gradual verification processing of partial software in step S817 and subsequent steps is referred to as software verification. Even if each verification processing is performed by the same MFP 100, entities which perform respective verifications are different, and the hardware verification is not verification processing of the software to be executed by the CPU 201.

When restart processing is started, the BIOS verification unit 221 is started up, and the BIOS verification unit 221 starts verification processing of the BIOS 360 in step S813.

In step S813, the MFP 100 performs the verification processing on the BIOS 360 and confirms whether the verification processing is successful. In a case where the verification processing is successful (YES in step S813), the MFP 100 executes processing in step S816. In a case where the verification processing fails (NO in step S813), the MFP 100 executes processing in step S814. In this verification processing, the BIOS verification unit 221 performs signature verification on a signature of the BIOS 360 loaded from the ROM 220 using a public key arranged in the BIOS verification unit 221. The verification at startup according to the present exemplary embodiment is the signature verification which takes into account a startup order. An entity which performs the signature verification verifies a signature of an entity to be started up next, and thus security is ensured.

In step S816, the MFP 100 instructs the CPU 201 to start up the BIOS 360.

In step S814, the BIOS verification unit 221 operating in the MFP 100 does not include a device for user notification and thus issues a notification by emitting light from a light emitting diode (LED), and the processing proceeds to step S815.

In step S815, the MFP 100 stops the system by cancelling a startup sequence without starting up the BIOS 360.

The hardware verification is a verification method implemented by hardware. The verification processing is not tampered with unless the integrated circuit is tampered with, and thus the verification method is extremely robust.

In a case where the BIOS 360 is started up, in step S817, the MFP 100 starts verification processing of the software arranged in the flash ROM 211.

In step S817, the MFP 100 performs verification processing on the loader 370 using the loader loading-and-verification unit 361 and confirms whether the verification processing is successful. In a case where the verification processing is successful (YES in step S817), the MFP 100 executes processing in step S818. In a case where the verification processing fails (NO in step S817), the MFP 100 executes the processing in step S814. In this verification processing, the MFP 100 performs the signature verification on the signature of the loader 370 which is a next startup target loaded from the flash ROM 211 using the public key included in the loader loading-and-verification unit 361.

In step S818, the MFP 100 starts up the loader 370.

In step S819, the MFP 100 performs verification processing on the kernel 390 using the kernel-and-Initrd loading-and-verification unit 371 and confirms whether the verification processing is successful. In a case where the verification processing is successful (YES in step S819), the MFP 100 executes processing in step S820. In a case where the verification processing fails (NO in step S819), the MFP 100 executes the processing in step S814. In this verification processing, the MFP 100 performs the signature verification on the signature of the kernel 390 which is a next startup target loaded from the flash ROM 211 using the public key corresponding to the signature of the kernel 390 included in the kernel-and-Initrd loading-and-verification unit 371.

In step S820, the MFP 100 starts up the kernel 390.

In step S821, the MFP 100 performs verification processing on the Initrd 380 using the kernel-and-Initrd loading-and-verification unit 371 and confirms whether the verification processing is successful. In a case where the verification processing is successful (YES in step S821), the MFP 100 executes processing in step S822. In a case where the verification processing fails (NO in step S821), the MFP 100 executes the processing in step S814. In this verification processing, the MFP 100 performs the signature verification on the signature of the Initrd 380 which is a next startup target loaded from the flash ROM 211 using the public key corresponding to the signature of the Initrd 380 included in the kernel-and-Initrd loading-and-verification unit 371.

In step S822, the MFP 100 starts up the Initrd 380.

In step S823, the MFP 100 performs verification processing on the flash ROM 211 using the verification-at-startup unit 381 and confirms whether the verification processing is successful. In a case where the verification processing is successful (YES in step S823), the MFP 100 executes processing in step S824. In a case where the verification processing fails (NO in step S823), the MFP 100 executes the processing in step S814. In this verification processing, the MFP 100 loads hash values of all program files loaded from the flash ROM 211 and included in the controller software 300 which is a next startup target and recalculates the hash values. Processing for comparing the recalculated hash value with the hash value described in the correct value list for verification at startup 321 is performed for each file.

In step S824, the MFP 100 starts startup of the controller software 300. The controller software 300 is divided into a plurality of program files, so that the program files necessary for startup of the system are sequentially started up.

In step S825, the MFP 100 starts up the verification-at-execution unit 322.

In step S814, the MFP 100 notifies a user of detection of tampering by displaying the error screen 801 on the operation unit 102.

In step S815, the MFP 100 stops the system by cancelling the startup sequence in this step.

In step S826, the MFP 100 terminates the verification processing of the software arranged in the flash ROM 211.

Generally, the software verification is a verification method implemented by software, so that the verification method can be tampered with by rewriting the software in the storage unit. As described in the above flow, the software for performing verification is verified in advance by another configuration unit, and thus it can be guaranteed that the software is not tampered with. The hardware verification is used at a starting point of linked software verification, and thus it can be guaranteed that the entire system is not tampered with. Further, the software verification is applied to startup of the verification-at-execution unit, and thus robust reliability can be ensured against tampering after startup of the system by starting with the hardware verification. Furthermore, the verification-at-execution unit is stopped at the time of software update, and there is a risk that the program is tampered with. However, verification at startup is always performed by restarting the system, and thus it can be guaranteed that the entire MFP 100 is not tampered with.

Figure 9:
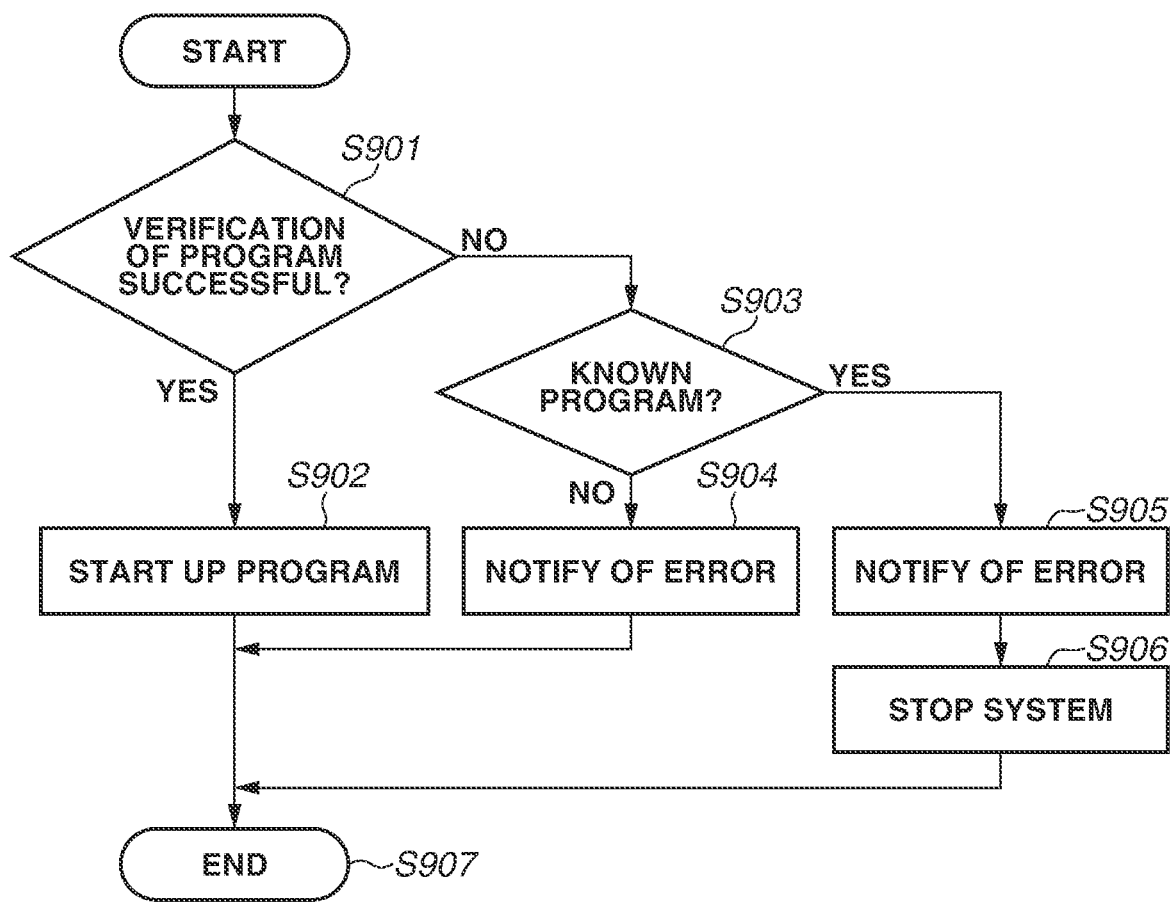
FIG. 9 is a flowchart illustrating a flow of processing to be performed in the MFP.

A processing flow to be performed by the MFP 100 to verify the software at the time of execution of the function will be described with reference to FIG. 9. The processing is performed every time each function illustrated in FIG. 5 is executed unlike the processing illustrated in step S813 and the subsequent steps in FIG. 8B which is executed only once at the time of startup. The software which is verified at the time of startup is verified again at the time of execution of the function, and thus tampering can be appropriately detected if the software is tampered with from the startup to the execution of the function. The verification only at the time of execution of the function is not regarded as robust verification based on the hardware verification. Therefore, robust reliability can be ensured by performing both of the verification at startup and the verification at execution. The processing to be performed by the MFP 100 in FIG. 9 is performed by the CPU 201 loading a program stored in the flash ROM 211 into the DRAM 202 and executing the program as calculation processing.

In a case where the MFP 100 executes the function, it is necessary to start up the program file corresponding to the necessary software, and verification processing at the time of execution of the function is started prior to the startup of the program file. For example, in a case where a user presses the button 402 to start the copy function, the program file necessary for execution of the copy function is verified and started up.

In step S901, the MFP 100 verifies a startup target program using the verification-at-execution unit 322 and confirms whether the verification is successful. In a case where the verification is successful (YES in step S901), the MFP 100 executes processing in step S902. In a case where the verification fails (NO in step S901), the MFP 100 executes processing in step S903. In this verification processing, the verification-at-execution unit 322 specifies a hash value corresponding to the startup target program by referring to the white list for verification at execution 323. The verification is performed by comparing the specified hash value with the hash value recalculated from the program file stored in the flash ROM 211. In a case where the hash value of the startup target program cannot be specified from the white list for verification at execution 323, it is determined that the verification fails.

In step S902, the MFP 100 starts up the target program.

In step S903, the MFP 100 determines whether the target program is a known program using the verification-at-execution unit 322. In a case where the target program is a known program (YES in step S903), the MFP 100 executes processing in step S905. In a case where the target program is an unknown program (NO in step S903), the MFP 100 executes processing in step S904. A case in which the target program is an unknown program is a case in which the hash value of the startup target program cannot be specified in step S901 and represents that the program is not the one added to the system using a regular procedure by the software update unit 310. Normally, a configuration is adopted in which any unit other than the software update unit 310 cannot add a program in order to prevent the system from being tampered with. Even if an unauthorized program is arranged by taking advantage of any vulnerability included in the system, execution of the unauthorized program can be blocked. Such a block mechanism as a precaution is necessary for a user to use the system with a sense of security in a highly confidential business. In a case where the known program is tampered with, the system is brought into a state in which a software component necessary for controlling the system is damaged, so that the operation as the system cannot be guaranteed. Thus, it is necessary to stop the entire system. In a case where only the unknown program is tampered with, on the other hand, all of the software components necessary for controlling the system are in a normal state. Thus, the system can continue the operation without stopping.

In step S904, the MFP 100 notifies a user of information indicating that execution of the unknown program is blocked as a system continuation error in the message display area 406 displayed on the operation unit 102. In this case, various buttons on the menu screen 401 can be pressed, and the MFP 100 continues the operation as the system.

In step S905, the MFP 100 notifies a user of information indicating that tampering is detected as a system stop error by displaying the error screen 801 on the operation unit 102.

In step S906, the MFP 100 stops input of a job from the network using the network control unit 307. The operation unit 102 cannot shift the screen from the error screen 801 to another screen, and the MFP 100 stops the operation as the system.

In step S907, the MFP 100 terminates the verification processing at the time of execution of the function.

As described above, the system according to the first exemplary embodiment which verifies tampering at the time of execution of a program stops the verification-at-execution function or the writing control when the program is updated in a state in which the verification-at-execution function is enabled. Further, the system is restarted after completion of update of the program, and verification at startup is executed, so that the system can prevent reduction in a processing speed while maintaining security.

According to the first exemplary embodiment, the verification-at-execution function or the writing control is always stopped in a case where the software is updated. In a case where, however, software update is performed on a partial program file, and the number of writing controls to be monitored is small, it is not necessary to stop the writing control.

According to a second exemplary embodiment, thus, it is determined whether to stop writing control according to a size of an update file.

Figure 10:
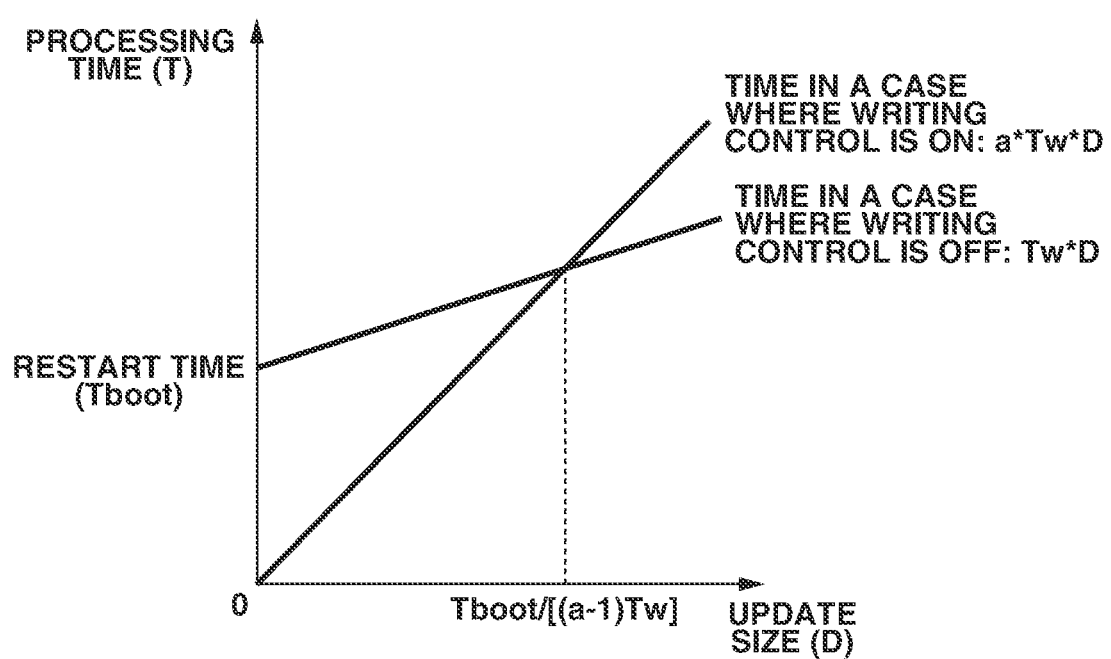
FIG. 10 is a graph illustrating a relationship between parameters.

A relationship between a size of an update file and a processing time will be described with reference to FIG. 10. In FIG. 10, an abscissa represents a size D (byte) of an update file, and an ordinate represents a processing time T (second). A writing time per byte is defined as Tw (second/byte), and a writing time per byte in a case where the verification-at-execution function is ON is defined as "a*Tw" (second/byte) (a>1). A time required for the MFP 100 to restart and to perform verification at startup is defined as Tboot (second). In a case where the verification-at-execution function is turned OFF at the time of update of the program, a time required for updating the software which includes the time to restart is expressed as "Tw*D+Tboot". As illustrated in FIG. 10, in a case where the size D is small, the processing time is shorter if the software is updated with the verification-at-execution function ON. In a case where the size D is larger than Tboot/[(a−1)Tw], the processing time is shorter if the software is updated with the verification-at-execution function OFF, and the system is restarted after the update. It is accordingly determined whether to turn OFF the verification-at-execution function using a magnitude relationship between the size D and Tboot/[(a−1)Tw]. However, in a case where software is actually updated, a writing time may take longer than an initial prediction in some cases. Therefore, an actual writing time is measured during writing, and the processing is returned to the flow for turning OFF the writing control if it is likely to take some time for writing.

Figure 11:
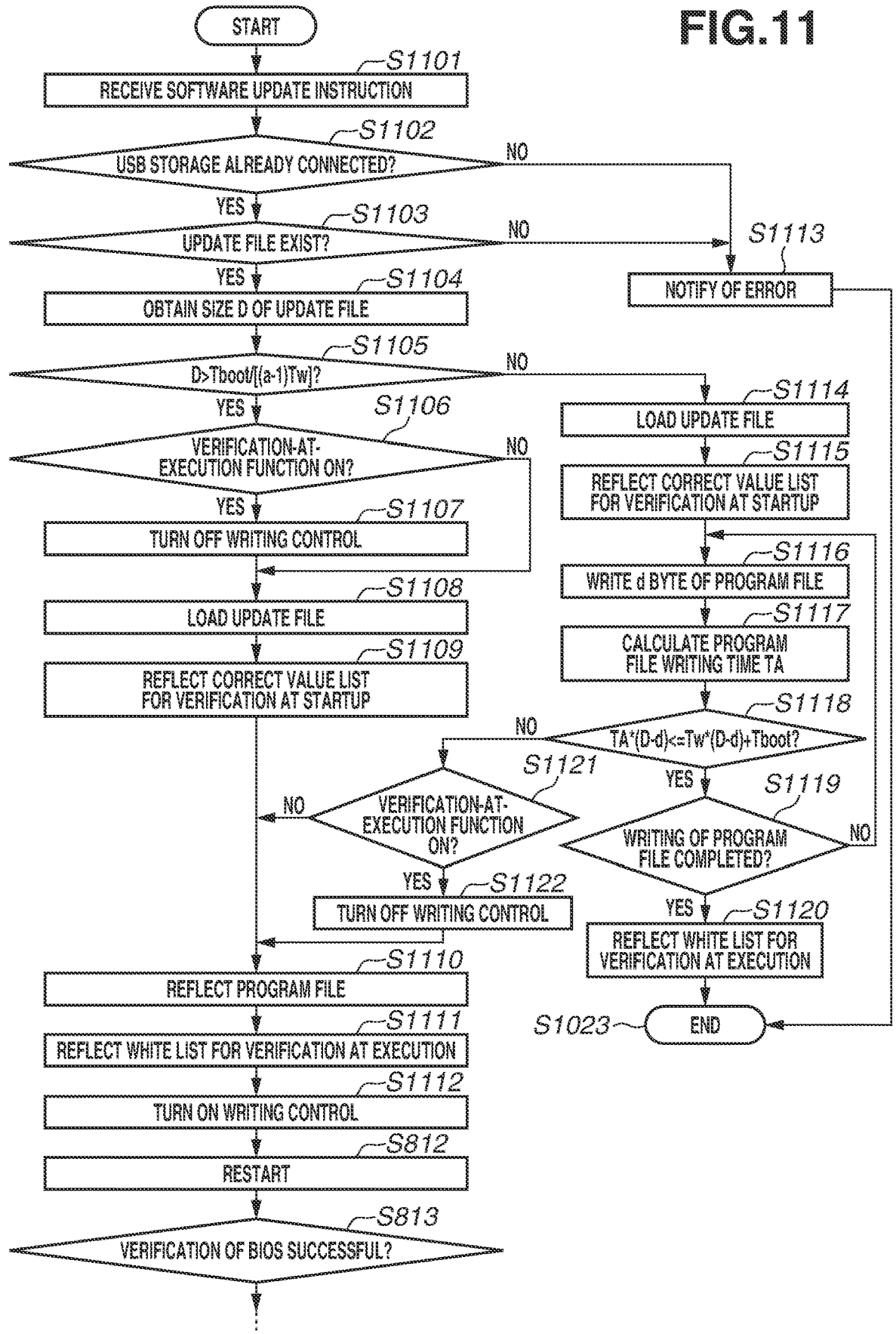
FIG. 11 is a flowchart illustrating a flow of processing to be performed in the MFP.

A processing flow according to the second exemplary embodiment will be described with reference to FIG. 11. A part similar to that according to the first exemplary embodiment will be described with reference to FIGS. 8A and 8B.

Processing in steps S1101 to S1103 and processing in step S1113 are similar to the processing in steps S801 to S803 and the processing in step S804, respectively. In a case where an update file exists in step S1103 (YES in step S1103), then in step S1104, the size D of the update file is obtained. Next, in step S1105, the size D is compared with Tboot/[(a−1)Tw] to determine whether the size D is larger than Tboot/[(a−1)Tw]. In a case where the size D is larger than Tboot/[(a−1)Tw] (YES in step S1105), processing in step S1106 is executed. In a case where the size D is not larger than Tboot/[(a−1)Tw] (NO in step S1105), processing in step S1114 is executed. In step S1106, it is confirmed whether the verification-at-execution function is ON. In a case where the verification-at-execution function is ON (YES in step S1106), processing in step S1107 is executed. In a case where the verification-at-execution function is OFF (NO in step S1106), processing in step S1108 is executed. In step S1107, the writing control of the verification-at-execution function is turned OFF. Processing in steps S1108 to S1111 is similar to that in steps S807 to S810. In step S1112, the writing control is turned ON. Processing in step S812 and subsequent steps is similar to that according to the first exemplary embodiment.

In step S1114, the update file is loaded as with the processing in step S807 and the processing in step S1108. In step S1115, the correct value list for verification at startup is reflected as with the processing in step S808 and the processing in step S1109. In step S1116, "d" bytes of the program file is written. In step S1117, a time required for writing is measured, and a writing time TA per byte is calculated. In step S1118, if a predicted value "TA*(D−d)" of a remaining time in a case where the writing is continued with the writing control being ON is shorter than or equal to a predicted value "Tw*(D−d)+Tboot" in a case where the writing control is turned OFF (YES in step S1118), processing in step S1119 is executed. If the predicted value "TA*(D−d)" is longer than the predicted value "Tw*(D−d)+Tboot" (NO in step S1118), processing in step S1121 is executed. In step S1119, it is confirmed whether the writing of the program file is completed. In a case where the writing of the program file is completed (YES in step S1119), processing in step S1120 is executed. In a case where the writing of the program file is not completed (NO in step S1119), processing is returned to step S1116. In step S1120, the white list for verification at execution is reflected as with the processing in step S1111 and the processing in step S810. In step S1023, the software update is terminated. In step S1121, it is determined whether the verification-at-execution function is ON as with the processing in step S1106. In a case where the verification-at-execution function is ON (YES in step S1121), then in step S1122, the writing control is turned OFF. In a case where the verification-at-execution function is OFF (NO in step S1121), the processing in step S1110 is executed.

According to the present exemplary embodiment, it can be optimally determined, by taking into account a processing time according to a size of an update file, whether to perform update in a state where the writing control of the verification-at-execution function is turned ON and then perform restarting, or to perform update in a state where the writing control is turned OFF and not perform restarting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-120327, filed Jun. 27, 2019, which is hereby incorporated by reference herein in its entirety.

What is claimed is:

1. An information processing apparatus comprising:
one or more processors configured to:
    perform first verification to verify first software with hardware verification at a time of startup of the information processing apparatus;
    perform second verification to verify second software based on the verified first software; and
    perform third verification to verify software to be executed at a timing prior to execution of the software,
    wherein, in a case where verification function of the third verification is in operation at a time of update of software of the information processing apparatus, the verification function of the third verification is stopped, and restart of the information processing apparatus is performed after completion of the update, so that a sequence of verification processes starting with the hardware verification is executed.

2. The information processing apparatus according to claim 1, wherein the verification function of the third verification is writing control.

3. The information processing apparatus according to claim 1, wherein the verification function of the third verification is stopped based on a size of the software to be updated.

4. The information processing apparatus according to claim 1, wherein, in a case where a size of the software to be updated is smaller than a value calculated from a time taken for restarting and a time taken for writing, the verification function of the third verification is not stopped, and restart is not performed after completion of the update.

5. An information processing method comprising:
performing first verification to verify first software with hardware verification at a time of startup of an information processing apparatus;
performing second verification to verify second software based on the verified first software; and
performing third verification to verify software to be executed at a timing prior to execution of the software,
wherein, in a case where verification function of the third verification is in operation at a time of update of software of the information processing apparatus, the verification function of the third verification is stopped, and restart of the information processing apparatus is performed after completion of the update, so that a sequence of verification processes starting with the hardware verification is executed.

6. A non-transitory storage medium storing a program causing an information processing apparatus to execute an information processing method, the information processing method comprising:
performing first verification to verify first software with hardware verification at a time of startup of the information processing apparatus;
performing second verification to verify second software based on the verified first software; and
performing third verification to verify software to be executed at a timing prior to execution of the software,
wherein, in a case where verification function of the third verification is in operation at a time of update of software of the information processing apparatus, the verification function of the third verification is stopped, and restart of the information processing apparatus is performed after completion of the update, so that a sequence of verification processes starting with the hardware verification is executed.

* * * * *